US010887236B2

United States Patent
Liu et al.

(10) Patent No.: US 10,887,236 B2
(45) Date of Patent: Jan. 5, 2021

(54) METHOD, NETWORK INTERFACE CARD, AND COMPUTER PROGRAM PRODUCT FOR LOAD BALANCE

(71) Applicant: EMC IP Holding Company LLC, Hopkinton, MA (US)

(72) Inventors: Fucai Liu, Beijing (CN); Fei Chen, Beijing (CN); Kun Wang, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 20 days.

(21) Appl. No.: 16/361,639

(22) Filed: Mar. 22, 2019

(65) Prior Publication Data

US 2019/0386922 A1 Dec. 19, 2019

(30) Foreign Application Priority Data

Jun. 15, 2018 (CN) .......................... 2018 1 0621797

(51) Int. Cl.
*H04L 12/803* (2013.01)
*H04L 12/935* (2013.01)
*H04L 12/741* (2013.01)

(52) U.S. Cl.
CPC ............ *H04L 47/125* (2013.01); *H04L 45/74* (2013.01); *H04L 49/3009* (2013.01)

(58) Field of Classification Search
None
See application file for complete search history.

(56) References Cited

U.S. PATENT DOCUMENTS

| | | | | |
|---|---|---|---|---|
| 5,774,660 A | * | 6/1998 | Brendel | H04L 29/06 709/201 |
| 10,412,159 B1 | * | 9/2019 | McCullagh | H04L 67/1038 |
| 2014/0372616 A1 | * | 12/2014 | Arisoylu | H04L 67/1029 709/226 |
| 2017/0111441 A1 | * | 4/2017 | Jalan | H04L 67/32 |
| 2017/0230451 A1 | * | 8/2017 | Paramasivam | H04L 67/22 |

* cited by examiner

*Primary Examiner* — Saba Tsegaye
(74) *Attorney, Agent, or Firm* — Ryan, Mason & Lewis, LLP (57) ABSTRACT

Embodiments of the present disclosure provide a method, a network interface card (NIC) and a computer program product for load balance. The method comprises determining, by a NIC of a network node, whether a packet obtained comprises a request to establish a network connection for a first device; in response to determining that the packet comprises a request to establish the network connection, determining whether the load balance associated with the network connection is to be applied by the NIC or a host processing device on the network node; and in response to determining that the load balance is to be applied by the NIC, applying the load balance among a set of devices using the NIC, so as to select a second device from the set of devices to establish the network connection with the first device. In this way, efficient and cost-effective load balance in the network can be achieved by means of the NIC.

20 Claims, 7 Drawing Sheets

FIG. 6 determining that the load balance is to be applied by the NIC, applying the load balance among a set of devices using the NIC, so as to select a second device from the set of devices to establish the network connection with the first device.

METHOD, NETWORK INTERFACE CARD, AND COMPUTER PROGRAM PRODUCT FOR LOAD BALANCE

RELATED APPLICATION(S)

The present application claims priority to Chinese Patent Application No. 201810621797.5, filed Jun. 15, 2018, and entitled "Method, Network Interface Card, and Computer Program Product for Load Balance," which is incorporated by reference herein in its entirety.

FIELD

Embodiments of the present disclosure relate to network technologies and more particularly, to a method, a network interface card and a computer program product for load balance.

BACKGROUND

The development of network technologies, especially of the Internet, enables people and various entities to communicate with each other efficiently and conveniently. In network communications, packets carrying data are distributed to other nodes in a network to provision a corresponding service. The packets generally include different information such as file, webpage, transaction information, or other types of information. Therefore, these packets should be properly distributed to different service nodes to achieve efficient services and complicated communications. Distribution of packets among different service nodes is also referred to as load balance. The load balance operations can enable effective packet transfer and processing in the network and coordinating load conditions among different service nodes so as to avoid overloaded or idle service nodes.

SUMMARY

Embodiments of the present disclosure provide a solution for load balance.

In a first aspect of the present disclosure, there is provided a method for load balance. The method comprises: determining, by a network interface card (NIC) of a network node, whether a packet obtained comprises a request to establish a network connection for a first device; in response to determining that the packet comprises a request to establish the network connection, determining whether the load balance associated with the network connection is to be applied by the NIC or a host processing device on the network node; and in response to determining that the load balance is to be applied by the NIC, applying the load balance among a set of devices using the NIC, so as to select a second device from the set of devices to establish the network connection with the first device.

In a second aspect of the present disclosure, there is provided an NIC. The NIC includes a processor and a memory coupled to the processor, the memory having instructions stored therein which, when executed by the processor, cause the NIC to perform acts. The acts comprise: determining whether a packet obtained comprises a request to establish a network connection for a first device; in response to determining that the packet comprises a request to establish the network connection, determining whether the load balance associated with the network connection is to be applied by the NIC or a host processing device on a network node that includes the NIC; and in response to determining that the load balance is to be applied by the NIC, applying the load balance among a set of devices using the NIC, so as to select a second device from the set of devices to establish the network connection with the first device.

In a third aspect of the present disclosure, there is provided a computer program product being tangibly stored on a computer-readable medium and comprising computer-executable instructions, the computer-executable instructions, when executed, causing a device to perform the method according to the first aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The objectives, advantages and other features of the present disclosure will become more apparent through the detailed description of example embodiments of the present disclosure with reference to the accompanying drawings, where the same reference symbols generally refer to the like elements in the example embodiments of the present disclosure.

DETAILED DESCRIPTION

Principles of the present disclosure will now be described with reference to several example embodiments illustrated in the drawings. Although some preferred embodiments of the present disclosure are shown in the drawings, it is to be appreciated that description of those embodiments is merely for the purpose of enabling those skilled in the art to better understand and further implement the present disclosure and is not intended for limiting the scope disclosed herein in any manner.

As used herein, the term "include" and its variants are to be read as open-ended terms that mean "include, but is not limited to." The term "or" is to be read as "and/or" unless explicitly being defined otherwise. The term "based on" is to be read as "based at least in part on." The terms "one example embodiment" and "an embodiment" are to be read as "at least one example embodiment." The term "another embodiment" is to be read as "at least one further embodiment." The terms "first" and "second" can represent different or the same objects. Other definitions, either explicit or implicit, may be included below.

Load balance refers to allocating, according to respective strategies, network traffic to different network nodes, to reduce the burden of an individual network node and improve efficiency of the whole system accordingly. The network is deployed therein with load balance nodes, which execute load balance operations on packets from a client, to allocate to respective servers or network devices. Because whether a plurality of network nodes can evenly share the service request is associated with the overall performance of the server and its scalability, the operation of a load balance dispatcher is critical for the service capability of the server. Accordingly, the load balance dispatcher is widely used in various scenarios, such as Internet data center, cloud-based local area network, and the like. The load balance dispatcher usually dispatches an external network service request to a set of network nodes based on a certain strategy. Load balance can be achieved at link layer, network layer or application layer, and the like.

Figure 1A:
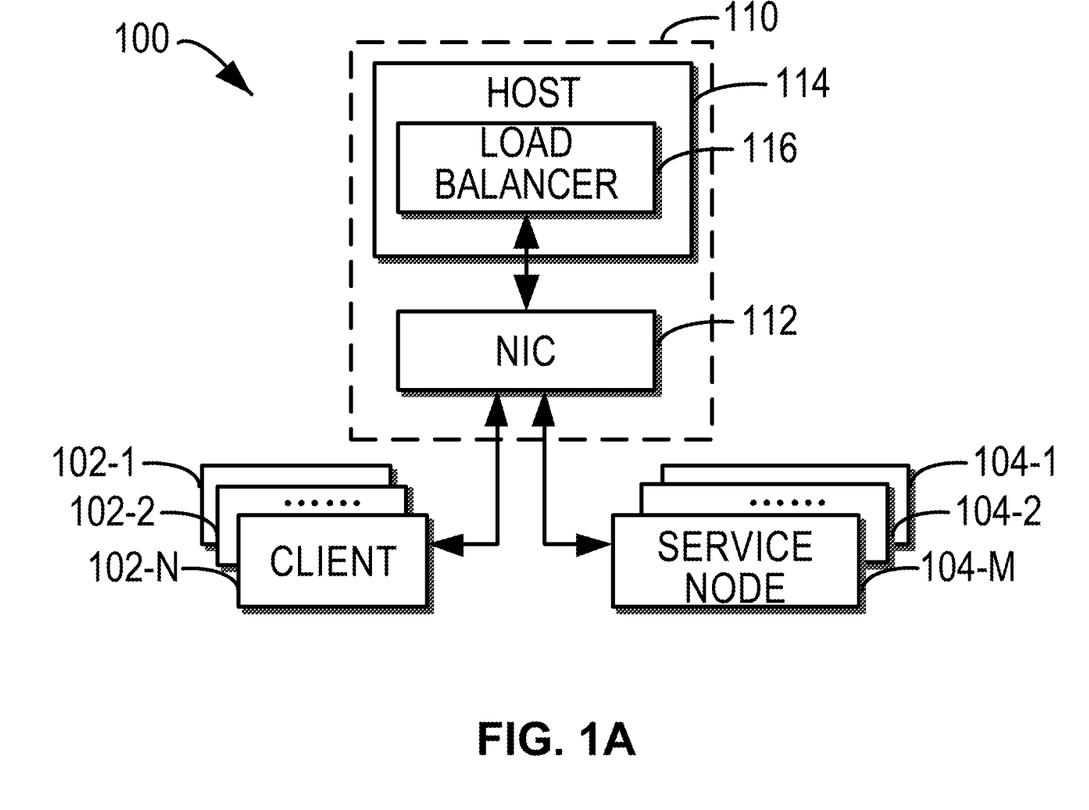
FIG. 1A illustrates a schematic block diagram of a conventional system for load balance.

FIG. 1A illustrates a schematic block diagram of a conventional system 100 for load balance. As shown in FIG. 1A, the network node 110 for load balance connects a plurality of clients 102-1, 102-2, . . . , 102-N and a plurality of service nodes 104-1, 104-2, . . . , 104-M. The network node 110 may be referred to as a load balance node, a load balance device, a network device and the like, and these terms can be used interchangeably herein. For purpose of description, the clients 102-1, 102-2, . . . , 102-N are collectively referred to as clients 102 and service nodes 104-1, 104-2, . . . , 104-M are collectively referred to as service nodes 104. The number of clients and service nodes shown in FIG. 1A is only by way of example and the system 100 can include more, less, or another number of clients or service nodes. The value of N is an integer greater than or equal to 1 and the value of M is an integer greater than 1.

The network node 110 includes a network interface card (NIC) 112 and a host 114 for processing operations. The network node 110 is interconnected with the clients 102 and the service nodes 104 via the NIC 112. In the operation, the network node 110 receives, via the NIC 112, one or more packets from the clients 102 to request establishing network connections. The NIC 112 simply provides the packets to the host 114. A load balancer 116 is running in the host 114 to apply the specific load balance operations. The load balancer 116 can process the received packets based on the configured load balance strategy and select from the plurality of service nodes 104 a server for forwarding the packets. After applying load balance, the load balancer 116 forwards the processed packets to a target device via the NIC 112, such as the selected service node 104. In this process, a network connection is established between the client 102 and a certain service node 104, and the client 102 and the service node 104 can receive and transmit data over the network connection. Data is received and transmitted via the network node 110, for example, the data is processed by the loader balancer 116 after being received via the NIC 112, to determine a destination device of the data and then transmit to the destination device via the NIC 112, for example.

In a conventional solution for load balance, the processing efficiency of the host 114 of the network node 110 for load balance becomes a bottleneck of network communications. The load balancer 116 is mainly dependent on the processing capacity of the processing device (such as Central Processing Unit (CPU), single-core/multi-core processor and the like). If the processing resources are insufficient, the packets that are not processed in time may be queued up in a stack, which causes a response latency jitter and significantly lowers the network communication efficiency. Although the current network infrastructure can support a network bandwidth up to for example 40/100 Gbps, the bandwidth cannot be fully utilized due to the restriction on the network node for applying load balance and thus the clients cannot be provisioned with the effective network communication service.

Figure 1B:
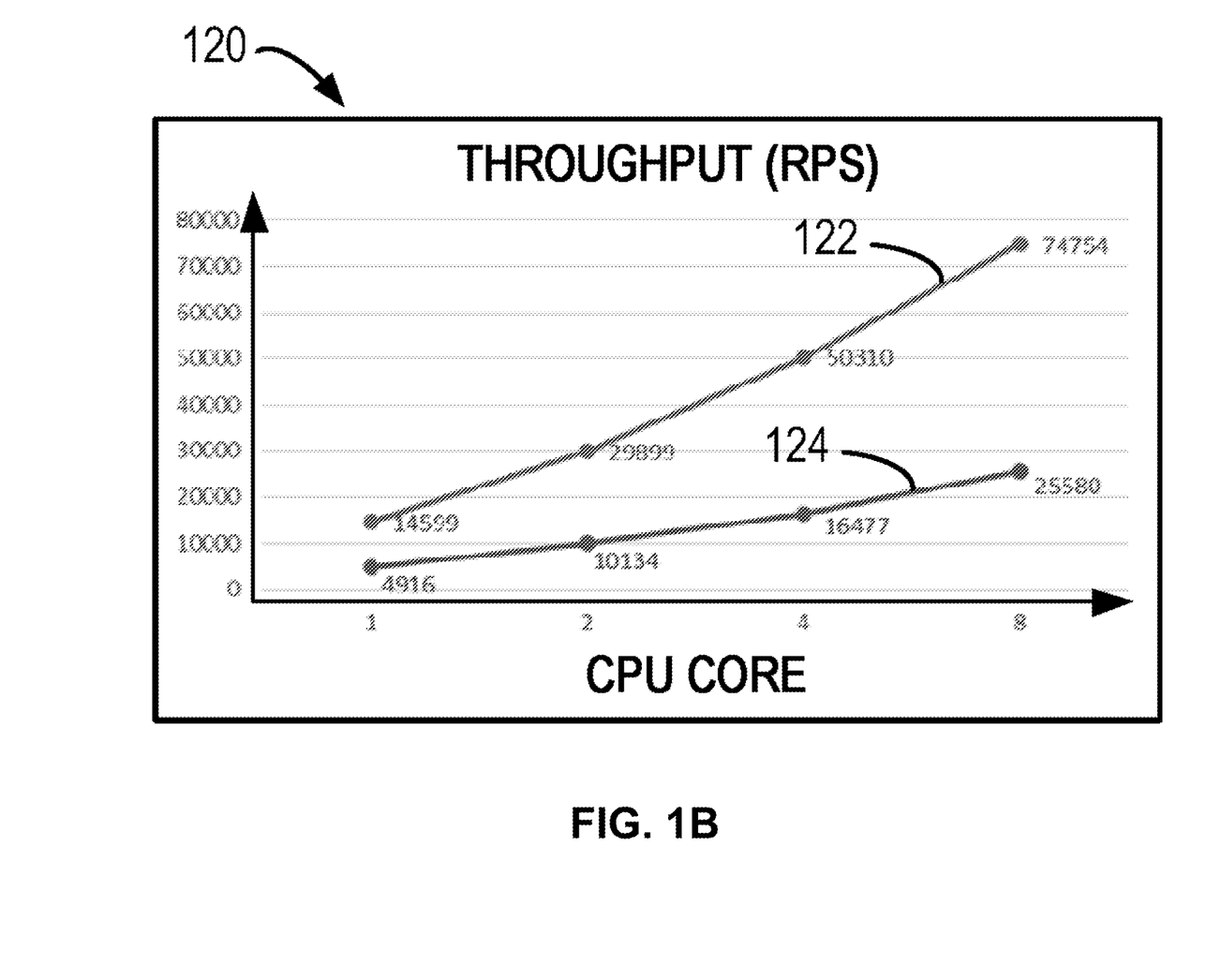
FIG. 1B illustrates a diagram showing an estimate on throughputs of a conventional load balancer running on a host.

FIG. 1B illustrates a diagram 120 of an estimate on throughputs of a conventional load balancer running on a host. The diagram 120 illustrates curves 122 and 124, which indicate that the throughputs of the conventional load balancer vary as the number of CPU cores changes when the packet payload is 832 bytes and 100 KB, respectively. In FIG. 1B, the throughput is measured in units of Request per Second (RPS). It can be seen from the curves 122 and 124 that the throughput of the load balancer is related to the number of CPU cores with different payloads. The greater the number of CPU cores, the stronger the processing capacity of the load balancer will be, and then a higher throughput is available accordingly.

In order to improve processing efficiency of load balance, a possible solution is processing more requests using a cluster of load balancers (e.g., a cluster of load balancers at the application layer). However, the solution of the load balancer cluster can at best increase the total processing capacity and the corresponding load balance nodes still cannot fully utilize all of the high network bandwidth. There is a further solution in which more processing resources are provided to apply the load balance, but this will cause additional expenses.

According to embodiments of the present disclosure, there is provided a solution for load balance. In this solution, an NIC acts as a selectable load balance processing device. After receiving a packet, a network node supporting load balance determines whether the corresponding load balance associated with the network connection is to be applied by the NIC or a host processing device on the network node. If it is determined that the load balance is to be applied by the NIC, the NIC processes the packet and applies the load balance for the network connection among a plurality of devices.

According to embodiments of the present disclosure, the NIC is present in the network node that applies the load balance and also has a strong capacity of processing. Especially with the development of technologies, an interface component, referred to as a smart NIC, has been developed. The smart NIC has a multi-core processor and dedicated processing devices such as a Field Programmable Gate Array (FPGA). Such a NIC has the potential to apply the load balance and as a network interface, can also support high-bandwidth network communications. According to this solution, efficient and cost-effective load balance can be implemented by means of the NIC in the network.

Embodiments of the present disclosure will be described in detail below with reference to the drawings.

Figure 2:
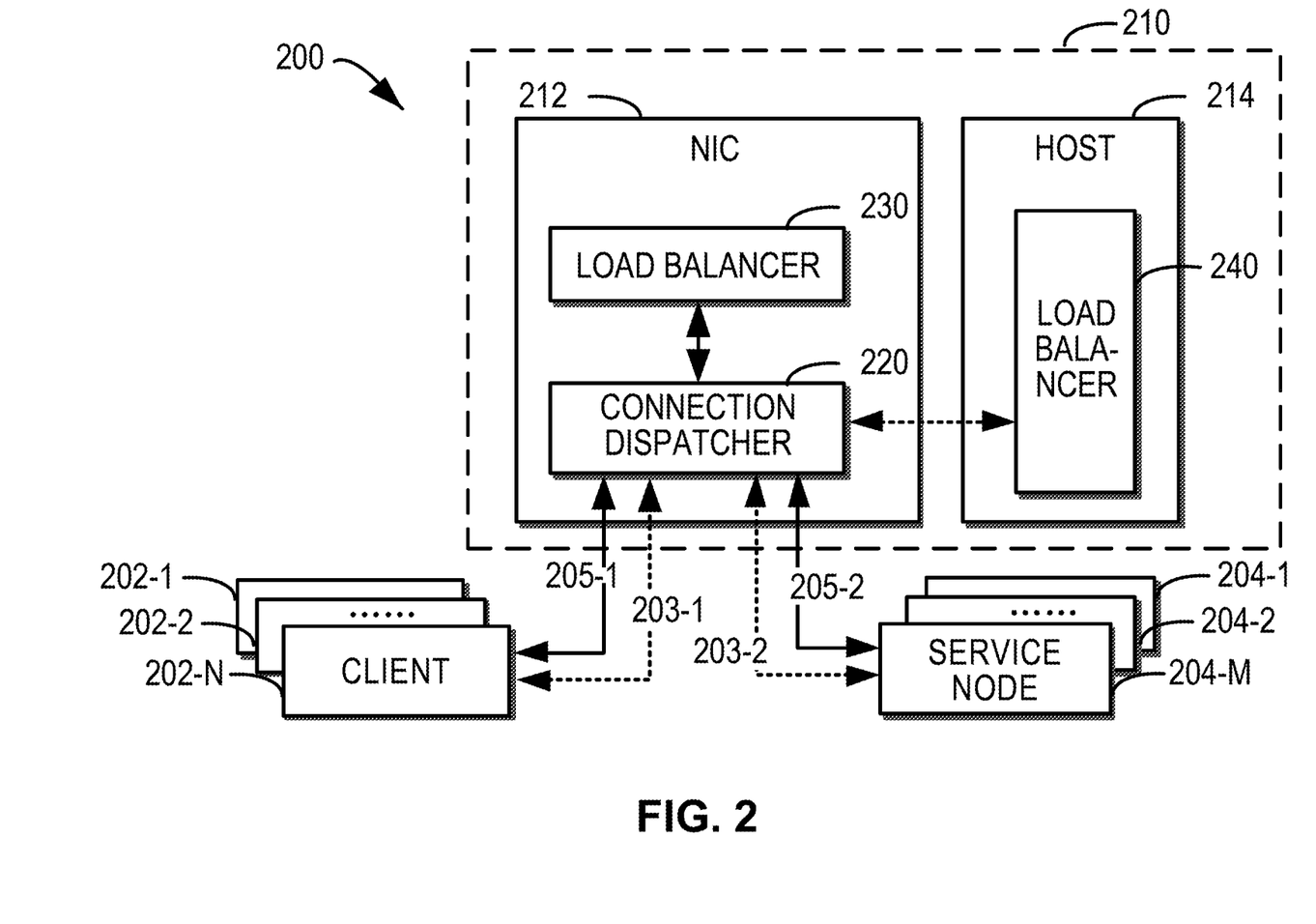
FIG. 2 illustrates a schematic block diagram of a system for load balance according to some embodiments of the present disclosure.

FIG. 2 illustrates a schematic block diagram of a system 200 for load balance according to some embodiments of the present disclosure. In the system 200, a network node 210 handles load balance between a plurality of clients 202-1, 202-2, . . . , 202-N and a plurality of service nodes 204-1, 204-2, . . . , 204-M. The network node 210 may be referred to as a load balance node, a load balance device, a network device and the like, and these terms can be used interchangeably herein. For the purpose of description, the clients 202-1, 202-2, . . . , 202-N are collectively referred to as clients 202 and the service nodes 204-1, 204-2, . . . , 204-M are collectively referred to as service nodes 204. A service node 204 can also be referred to as a network node, a network device, a server and the like, and these terms can be used interchangeably herein. The number of clients and service nodes shown in FIG. 2 is only an example. The system 200 can include more, or less, or another number of clients or servers. The value of N is an integer greater than or equal to 1 and the value of M is an integer greater than 1.

In the embodiments of the present disclosure, the clients 202 can be any devices with the communication capability, such as any types of computing devices, computing systems, mobile devices, fixed equipment or portable devices, including a mobile phone, site, unit, device, multimedia computer, multimedia tablet, Internet nodes, communicator, desktop computer, laptop computer, notebook computer, netbook computer, tablet computer, Personal Communication System (PCS) device, personal navigation device, Personal Digital Assistant (PDA), audio/video player, digital camera/video, positioning device, television receiver, radio broadcast receiver, electronic book device, gaming device, Internet of Things (IoT) device or other devices available for communication, or any combinations thereof. The network node 210 or service nodes 204 can be any devices deployed in the network for providing services to the clients 202, such as various types of servers, computing devices, computing systems, mainframes, distributed computing systems, data centers, and the like.

As shown in FIG. 2, the network node 210 includes a network interface card (NIC) 212 and a host 214. The network node 210 interconnects via the MC 212 with the clients 202 and the service nodes 204. The host 214 includes computing resources of the network node 210, including various processing and storage resources. Therefore, the host 214 also may be referred to as a host processing device 214, on which a load balancer 240 is running. A further load balancer 230 is running in the NIC 212 according to embodiments of the present disclosure. Both the load balancers 230 and 240 can apply network connection-related load balance operations. The load balancer 230 applies the load balance using available processing resources and storage resources of the NIC 212 while the load balancer 240 applies the load balance using available processing resources and storage resources of the host 214.

As an interface connecting with the client 202 and the service node 204, the NIC 212 also includes a connection dispatcher 220 for determining whether the load balance on a given network connection is to be applied directly by the load balancer 230 on the NIC 212 or is to be directed to the load balancer 240 on the host 214. Load balance can be implemented at the link layer, network layer or application layer among other different layers. In some embodiments of the present disclosure, a load balance mechanism implemented at the application layer is taken as an example for purpose of explanation. However, it is to be appreciated that this is not a limitation and those skilled in the art can properly apply the load balance mechanism at other network layers.

In the example of FIG. 2, the connection dispatcher 220 allocates a network connection 203-1 with the client 202 and a network connection 203-2 with the service node 204 to the load balancer 240 on the host 214. The network connection 203-2 is a network connection established with a particular service node 204 by the request of the client 202 for initiating the network connection 203-1. The network connections 203-1 and 203-2 implement a network connection 203 between the client 202 and the service node 204. Data transfer (traffic) between the client 202 and the service node 204 is coordinated by the load balancer 240.

In addition, the connection dispatcher 220 allocates a network connection 205-1 with the client 202 and a network connection 205-2 with the service node 204 to the load balancer 230 on the NIC 212. The network connection 205-2 is a network connection established with a particular service node 204 by the request of the client 202 for initiating the network connection 205-1. The network connections 205-1 and 205-2 implement a network connection 205 between the client 202 and the service node 204. Data transfer (traffic) between the client 202 and the service node 204 is coordinated by the load balancer 230. The client(s) 202 corresponding to the network connections 203-1 and 205-1 may be the same or different, and the service node(s) 204 corresponding to the network connection 203-2 and 205-2 may also be the same or different.

According to embodiments of the present disclosure, by unloading a part of the load balance task to the MC of the network node, the processing resources of the host processing device of the network node can be saved and a faster network access speed can also be enabled for the client. According to embodiments of the present disclosure, it is unnecessary to change functions of the load balancer on the host of the conventional network node, and the network connection dispatch and load balance operations unloaded from the host can be implemented on the NIC, which facilitates convenient deployment of the load balance solution of the present disclosure in various network nodes handling the load balance.

Figure 3:
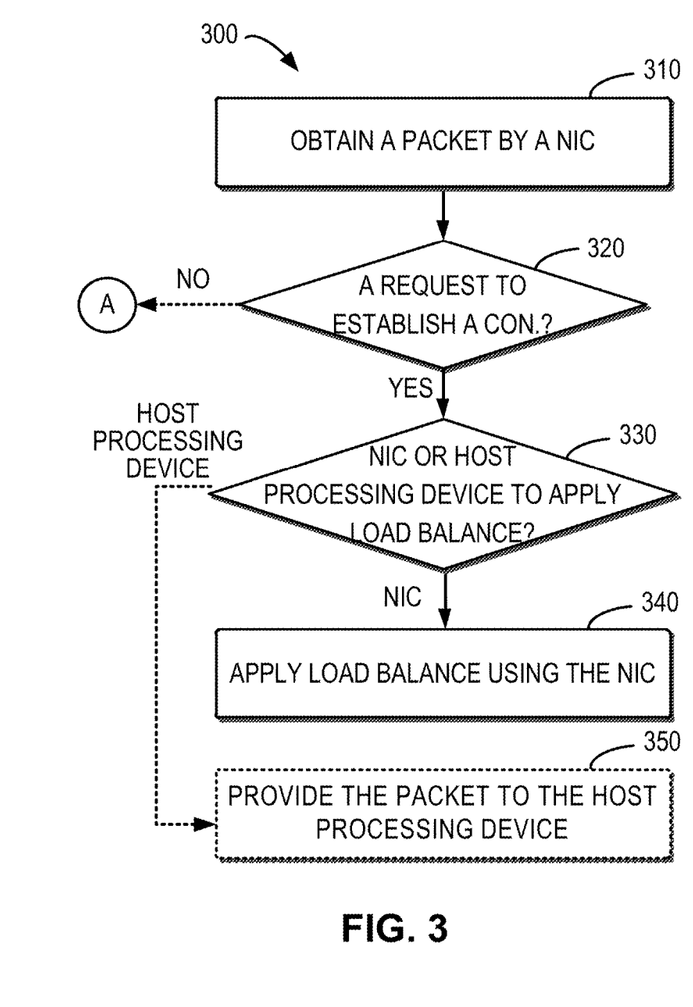
FIG. 3 illustrates a flowchart of a process of applying load balance according to some embodiments of the present disclosure.

FIG. 3 illustrates a flowchart of a process 300 for implementing load balance on an NIC according to some embodiments of the present disclosure. The process 300 may be implemented at the NIC 212 of the network node 210 of FIG. 2. Embodiments of the present disclosure are not limited in this regard. For the sake of discussion, the description will be made with reference to FIG. 2. It is to be appreciated that steps and their order shown in the process 300 are for purpose of example only and the process 300 can also include additional steps not shown and/or have some shown steps omitted, and the order of the steps can also be changed.

At block 310, the NIC 212 (e.g., the connection dispatcher 220 of the NIC 212) obtains a packet. The NIC 212 may obtain the packet from various sources depending on specific communication processes. The packet may be obtained from an external node and is required to be forwarded to components inside the network node 210 (such an obtained packet being referred to as an incoming packet in this case), or the packet may be obtained from an internal component and is required to be forwarded to an external node (such an obtained packet being referred to as an outgoing packet in this case).

When a network connection is not established between the client and the service node, the connection dispatcher 220 receives from the client 202 a packet which usually includes a request that the client expects to establish a network connection, which may need to be transferred to the load balancer 230 or the load balancer 240 for processing. In some other cases, as described below, in response to a request to establish a network connection from the client 202, the load balancer 230 or 240, after applying the load balance, determines a service node 204 which satisfies the requirements of the load balance solution, and will send to the service node a packet consisting of a request to establish a network connection. In this case, the connection dispatcher 220 will obtain the packet from the load balancer 230 on the NIC 212 or the load balancer 240 on the host 214. The packet is transmitted to the particular service node 204. The connection dispatcher 220 may also receive the packet from the service node 204.

Different operations may be performed depending on the specific situations of packets. At a stage of requesting a network connection, the NIC 212 determines whether load balance associated with the network connection is to be applied by the NIC 212 or the host processing device. Therefore, the NIC 212 (e.g., the connection dispatcher 220 on the NIC 212) determines, at block 320, whether the obtained packet includes a request to establish a network connection for the client 202. The obtained packet may include corresponding fields or identity information for indicating whether the packet includes a request to establish a network connection (indicated by SYN in the example of a TCP connection) or to close an established network connection (indicated by FIN in the example of a TCP connection), or is carrying the data (indicated by PSH in the example of a TCP connection). The specific format of the packet depends on the communication protocol followed among the client and the network node. In some embodiments, the format can depend on a Transmission Control Protocol/Internet Protocol (TCP/IP). Other protocols are also possible.

If the obtained packet is an incoming packet and the NIC 212 determines that the packet includes a request to establish a network connection, the NIC 212 (e.g., the connection dispatcher 220 on the MC 212) determines, at block 330, whether the load balance associated with the network connection is to be executed by the NIC 212 (e.g., the load balancer 230) or the host processing device 214 on the network node 210 (e.g., the load balancer 240).

The connection dispatcher 220 can determine, based on various factors, whether the load balance of the network connection to be established is to be applied by the load balancer 230 or the load balancer 240. In some embodiments, the connection dispatcher 220 obtains at least one of first metadata associated with the network connection and second metadata associated with the NIC 212 and determines, based on the obtained metadata, a degree of confidence for applying the load balance by the NIC. The degree of confidence is compared with a threshold degree of confidence, and if the degree of confidence exceeds the threshold degree of confidence, the connection dispatcher 220 determines that the load balance is to be applied by the NIC. In some embodiments, a strategy for determining a destination of the load balance (i.e., load balancer 230 or 240) in the connection dispatcher 220 may change dynamically, for example, may be adaptively configured according to the specific deployment environment.

The first metadata associated with the network connection may include factors of the network connection to be established which may have an impact on whether the load balance is to be applied by the NIC. In some embodiments, the first metadata may indicate one or more of the following: a port that receives the packet, a network address corresponding to the packet (e.g., the IP address), an active duration of the network connection, the number of application requests of the network connection, a size of data to be transferred over the network connection and an encryption requirement on data to be transferred over the network connection.

In some examples, the load balancer 230 of the NIC 212 may be configured to provide the load balance operations only for the network connection that is associated with one or more particular ports, which is/are preconfigured listening port(s) for the NIC 212. The connection dispatcher 220 may determine whether the port that receives the packet is a listening port and set a corresponding degree of confidence to a higher value when it is determined that the port receiving the packet is a listening port. If the port receiving the packet is not a listening port, the connection dispatcher 220 can set the corresponding degree of confidence to a lower value. Alternatively, if the port receiving the packet is not a listening port, the connection dispatcher 220 may also directly determine that the load balance operations cannot be provided by the load balancer 230 but instead, the load balancer 240 can handle the network connection to execute the load balance operations associated with that network connection.

In some examples, the load balancer 230 of the NIC 212 may be configured to provide the load balance operations only for a network connection that originates from or has a destination to a particular network address. The connection dispatcher 220 may also determine the degree of confidence in a similar manner to that for the listening port. In some examples, the connection dispatcher 220 may predict an active duration of the network connection, the number of application requests of the network connection and/or a size of data to be transferred over the network connection. The size of data, which may possibly be transferred over the network connection to be established, is estimated based on one or more factors such as the network address corresponding to the network connection, the historic data transfer size of the network address, the number of requests over the network connection, and the like. The larger the predicted size of data is, the higher the degree of confidence is determined by the connection dispatcher 220 for applying the load balance by the NIC 212. This is because the NIC 212 usually has a lower CPU frequency and a shorter network packet path, which makes it more suitable for communications of massive data.

In some examples, if the data to be transmitted over the network connection to be established has an encryption/decryption requirement, for example, the network connection to be established is a Secure Socket Layer connection, the load balancer 230 on the NIC 212 is more suitable for the load balance associated with that connection because the NIC is usually capable of hardware encryption/decryption acceleration. In one example, if the connection to be established is a network connection to a 443 port (the https port), the connection dispatcher 220 may determine the degree of confidence for the NIC 212 as a higher value.

Alternatively, or in addition, the connection dispatcher 220 may also determine the degree of confidence by taking the second metadata associated with the NIC 212 into account, and the second metadata can indicate, for example, the number of network connections with load balance applied by the NIC 212 (i.e., by the load balancer 230) and the resource usage of the NIC 212. The resource usage of the NIC 212 may include the usage of processing resources and/or storage resources on the NIC 212. In some examples, if the number of connections managed by the NIC 212 is large or the resource usage amount of the NIC 212 is great, then the connection dispatcher 220 may determine the degree of confidence to a lower value (or even to a negative value).

In some embodiments, the connection dispatcher 220 may determine the degree of confidence by combining a plurality of factors indicated by the first metadata and/or the second metadata. For example, a respective degree of confidence may be determined for each of the plurality of factors, and the final degree of confidence may be determined based on the degrees of confidence for the plurality of factors for the determination of whether the load balance associated with the connection is to be applied by the NIC 212. The degrees of confidence of the plurality of factors may have an impact on the final degree of confidence in various ways; for example, the degrees of confidence may be directly summed up, may be summed up after weighting, and/or may be summed up after normalization, so to calculate the final degree of confidence.

If it is determined, at block 330, that the load balance of the network connection to be established is to be applied by the NIC 212, the connection dispatcher 220 applies, at block 340, the load balance using the NIC 212 (e.g., the load balancer 230 on the MC 212), so as to select from a set of devices (such as the service nodes 204) a service node 204 to establish the network connection with the client 202. The load balancer 230 may be configured with various load balance mechanisms and the basic principle is to balance the load on the plurality of service nodes 204. During the application of the load balance, for a given network connection request, the load balancer 230 selects, at least based on a load balance strategy and the obtained packet, one service node 204 from the service nodes 204 for serving the client 202 which sends that request. According to the specific load balance mechanism, the load balancer 230 may also apply various other operations to implement the load balance associated with the network connection. The implementations of the present disclosure have no specific limitation on the detailed operations in the load balancer.

In some embodiments, in response to the request to establish the network connection (i.e., the provided packet) from the client 202, the load balancer 230 may actively initiate a request to establish a network connection with the selected service node 204. The request to establish the network connection can be included in a packet generated by the load balancer 230, which may be provided to the connection dispatcher 220 and forwarded to a corresponding service node 204. In this way, a complete network connection can be established between the client 202 and the service node 204, such as the network connection 205 in FIG. 2. The packet on the network connection 205 applies the load balance via the network node 210, and more particularly via the load balancer 230 therein.

In some embodiments, if the connection dispatcher 220 determines, at block 330, that the load balance is to be applied by the host 214 (such as the load balancer 240), the connection dispatcher 220 provides, at block 350, the packet to the host 214 for processing. The load balancer 240 on the host 214 may process the packet according to various load balance mechanisms configured therein to perform the load balance operations. Implementations of the present disclosure are not limited in this regard. In some implementations, in response to the packet of the client 202 requesting to establish a network connection, the load balancer 240, after applying the load balance, selects a service node 204 and sends to the service node 204 a further packet which requests to establish a network connection. The packet may be sent via the connection dispatcher 220 to the selected service node 204. In this way, a complete network connection can be established between the client 202 and the service node 204, such as the network connection 203 in FIG. 2. The packets on the network connection 203 apply the load balance via the network node 210, especially the load balancer 240 therein.

It has been discussed above that the connection dispatcher 220 determines how the load balance of the newly established network connection is allocated to the load balancer 230 on the NIC 212 or the load balancer 240 on the host 214. In order to maintain the established network connection, the connection dispatcher 220 may maintain a flow table, in which each flow table entry indicates a destination of each packet received by the connection dispatcher 220. Each flow table entry corresponds to a network connection. For example, each flow table entry can include the following: a source port indicating a source port of the packets transferred over the network connection, a source network (IP) address representing a source address of the packet, a destination port indicating a target port to which the packet is forwarded, and a destination to apply associated load balance of the network connection. Depending on allocation of the load balance of the network connection by the connection dispatcher 220, the destination of each flow table entry directs to either the NIC 212 (i.e., the load balancer 230 thereon) or the host 214 (i.e., the load balancer 240 thereon). Once a new network connection is to be established, the connection dispatcher 220 updates the flow table to add a new flow table entry.

It has been discussed above how the load balance is allocated for the newly established network connection when an incoming packet received by the NIC 212 includes a request to establish a network connection. In some embodiments, the packet obtained by the connection dispatcher 220 is an outgoing packet from the load balancer 230 or 240 and the outgoing packet indicates that a network connection is to be established with the service node 204. This request may be a request to establish a network connection that is actively initiated by the load balancer 230 or 240 after processing the packet from the client 202. As mentioned above, the connection dispatcher 220 may simply forward the packet to a corresponding service node 204. The connection dispatcher 220 may also add a flow table entry into the flow table to maintain the network connection with the service node 204.

As mentioned above, the packet obtained by the connection dispatcher 220 may include other information except for the request to establish a network connection. In this case, the connection dispatcher 220 may also implement corresponding operations. Such embodiments will be described below with reference to the process 400 shown in FIG. 4. The process 400 includes possible operations when it is determined that the packet does not include the request to establish a network connection at block 320 of the process 300 of FIG. 3. The process 400 may also be implemented at the NIC 212.

Figure 4:
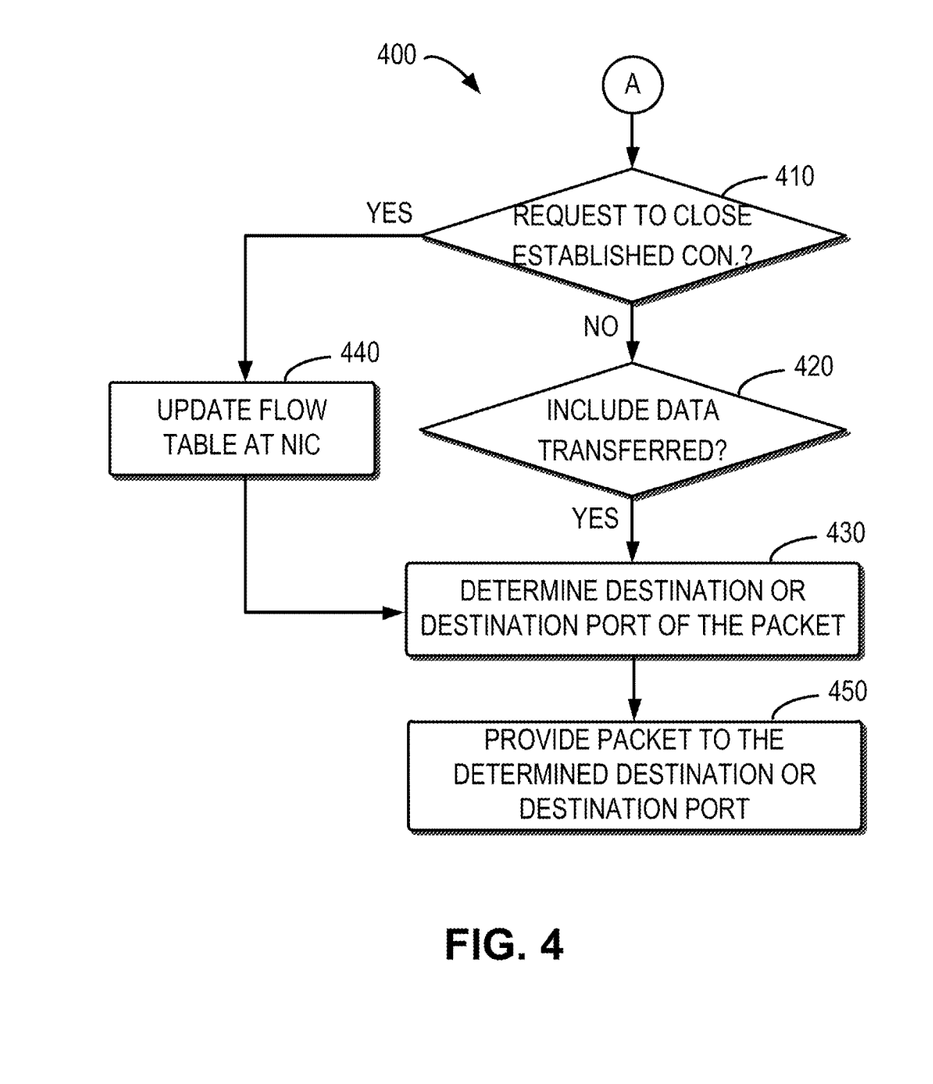
FIG. 4 illustrates a flowchart of a process of applying load balance according to some other embodiments of the present disclosure.

At block 410, the NIC 212 (e.g., the connection dispatcher 220 on the NIC 212) determines whether the packet includes a request to close an established network connection. Whether the packet includes a request to close an established network connection may also be determined by information or identity in a corresponding field of the packet. This packet may be actively initiated by the client 202 to close the established network connection. The packet may also be actively initiated by the load balancer 230 or 240 after receiving a packet which requests to close an established network connection from the client 202. The packet may be sent to the service node 204 corresponding to the network connection to request to close the network connection. The packet initiated by the load balancer 230 or 240 is provided to the connection dispatcher 220 first.

If it is determined that the obtained packet does not include a request to close a network connection, the NIC 212 (e.g., the connection dispatcher 220 on the NIC 212) determines, at block 420, whether the packet includes data transferred over the established network connection.

Whether the packet includes transferred data may also be determined by information or identity in a corresponding field of the packet. This packet may be an incoming packet received by the connection dispatcher 220 from the client 202 or the service node 204 over the established network connection, or may be an outgoing packet after the load balancer 230 or 240 applies the load balance operations. During normal communications after the establishment of the network connection, data communication between the client 202 and the corresponding service node 204 can be implemented via the network node 210. The load balance processing on the packet carrying data that is generated during the data communication process is implemented by the load balancer 230 or 240 allocated to the network connection and then is transferred to the destination device.

If it is determined that the obtained packet includes data, the NIC 212 (e.g., connection dispatcher 220 on the NIC 212) determines, at block 430, a destination or a destination port of the packet. The connection dispatcher 220 may determine, based on the maintained flow table, the destination (e.g., the load balancer 230 or 240) of each packet or the target port to which each packet is forwarded (towards the client 202 or the service node 204).

If it is determined that the packet includes a request to close the network connection at block 410, the NIC 212 (e.g., the connection dispatcher 220 on the NIC 212) updates, at block 440, the maintained flow table. The flow table contains corresponding flow table entries for the established network connections. Regardless of whether the packet including a request to close the network connection comes from the client 202 or the load balancer 230 or 240, the connection dispatcher 220 may delete a corresponding flow table entry corresponding to the established network connection from the flow table, so as to update the flow table.

After the destination or the destination port of the packet is determined at block 430, the NIC 212 (e.g., the connection dispatcher 220 on the NIC 212) provides, at block 450, the packet to the determined destination or the destination port. As such, the transfer of the packet to the target device/component is completed.

Some embodiments of processes in which the NIC 212 can apply the load balance have been discussed above. It is to be appreciated that some steps in the process 300 and the process 400 are not necessarily executed in the order shown in the drawings, and some steps may be omitted. For example, block 350 in the process 300 is optional. In addition, the order of the block 320 in the process 300 and the order of the blocks 410 and 420 in the process 400 can be changed or executed in parallel. In other words, the NIC 212 can determine, as required, the order for determining whether the packet includes a request to establish a network connection, a request to close a network connection, or data transfer. In another example, it is unnecessary to individually specify the determination on the data transfer (i.e., block 420); instead, after it is determined that the packet does not include a request to establish or close a network connection, it can be directly determined that the packet may include data.

Figure 5:
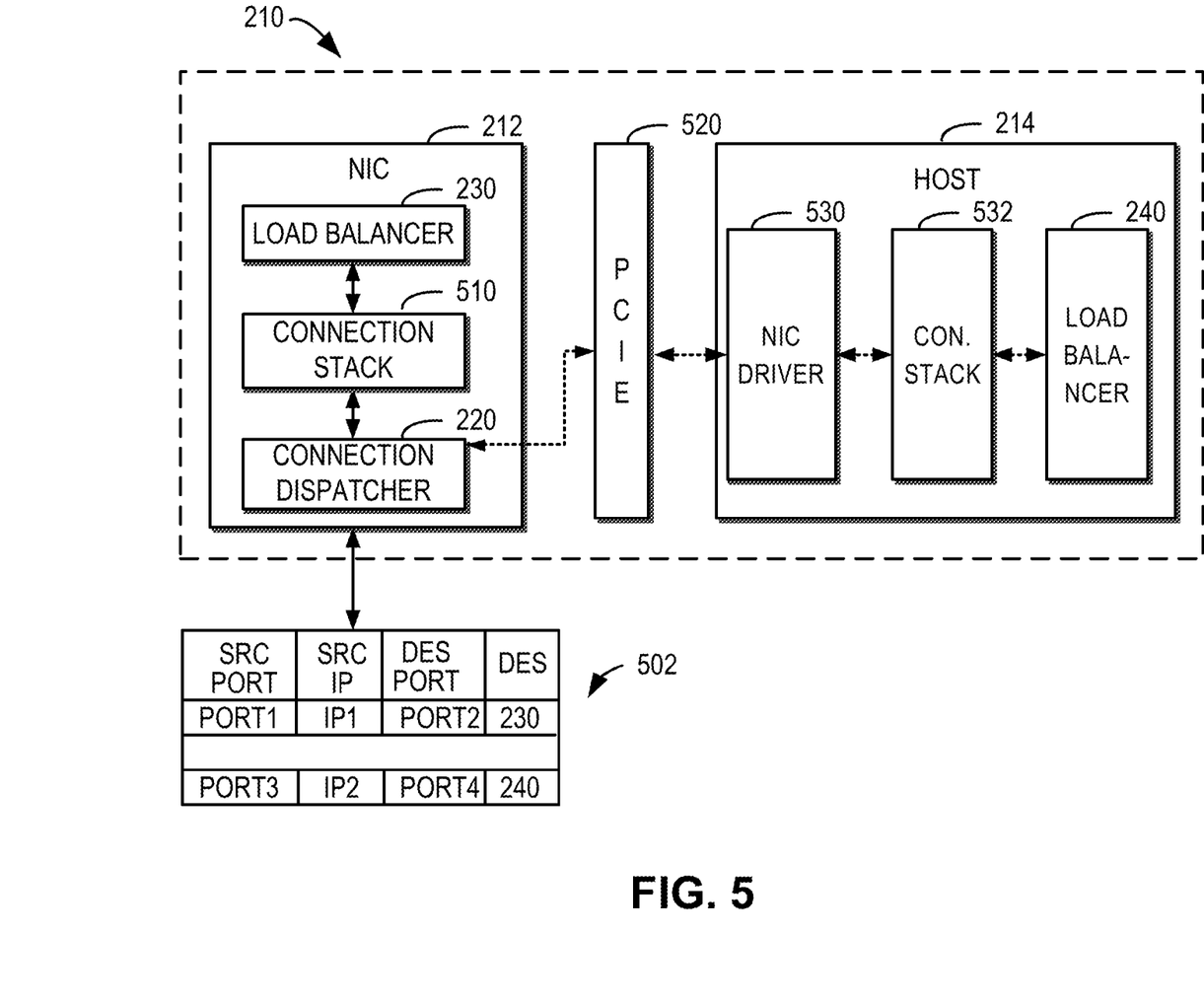
FIG. 5 illustrates a block diagram of a specific example structure of the network node of FIG. 2 according to some embodiments of the present disclosure.

FIG. 5 illustrates a specific structure example of the network node 210 of FIG. 2 according to some further embodiments of the present disclosure. As shown in FIG. 5, the NIC 212 and the host 214 may interconnect via an interface, such as a Peripheral Component Interface Express (PCIe) 520 among other high-speed interfaces in the network node 210. The connection dispatcher 220 in the NIC 212 may provide packets to the host 214 via the PCIe interface 520.

As mentioned in some embodiments above, the connection dispatcher 220 of the NIC 212 may maintain a flow table 502 for indicating how each network connection is forwarded. Each entry of the flow table 502 may indicate information such as the source port, the source IP address, the destination port, the destination of the network connection, and the like. The NIC 212 may also include a connection stack 510. The packet towards the load balancer 230 may be queued in the connection stack 510. The host 214 also includes an NIC driver 530 provided for supporting data exchange with the NIC 212 via the PCIe interface 520. The host 214 further includes a connection stack 532. The packets towards the load balancer 240 may be queued in the connection stack 532.

Figure 6:
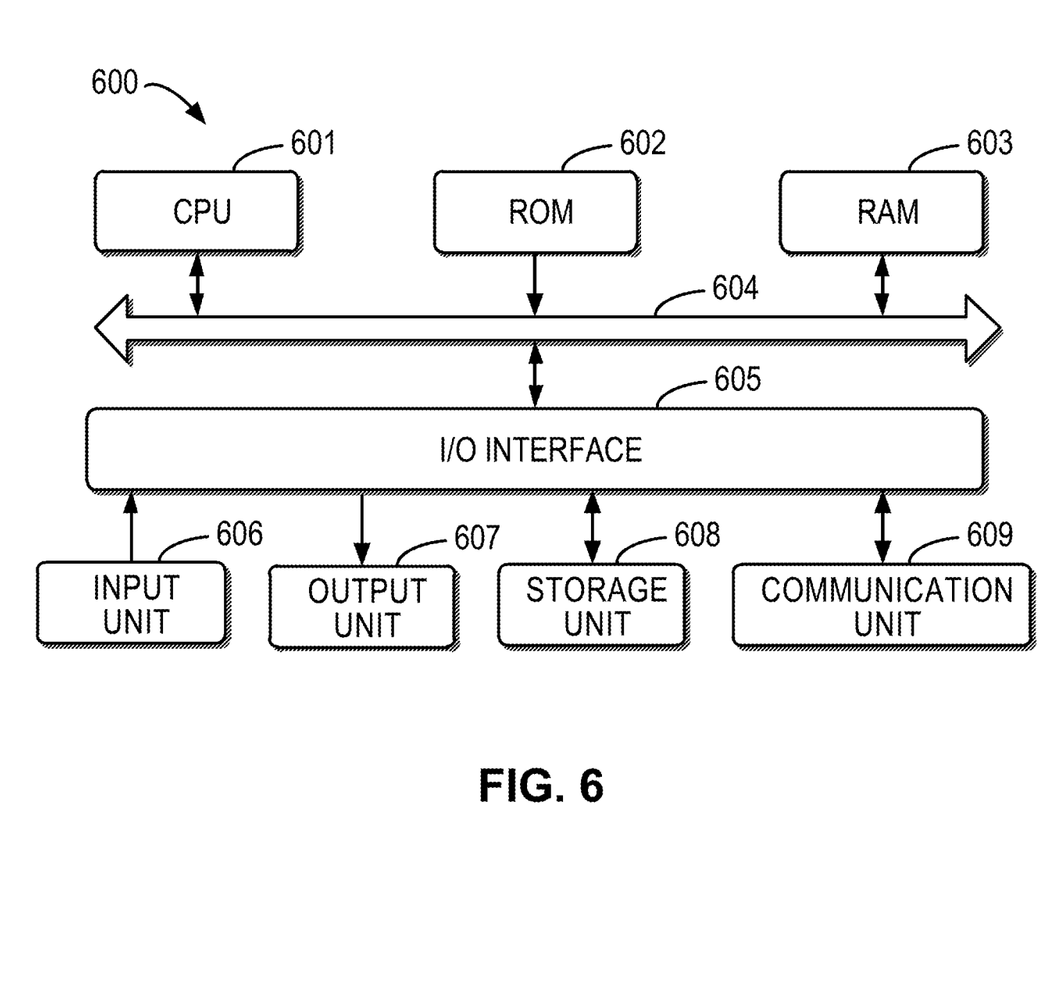
FIG. 6 illustrates a block diagram of an example device suitable for implementing embodiments of the present disclosure.

FIG. 6 illustrates a schematic block diagram of an example device 600 for implementing embodiments of the present disclosure. The device 600 can be implemented as the network node 210 (or a part of network node 210, such as NIC 212), the client 202 or the service node 204 of FIG. 2. The device 600 can be used to implement the process 300 of FIG. 3 and/or the process 600 of FIG. 6. As shown, the device 600 includes a central processing unit (CPU) 601, which can execute various suitable actions and processing based on the computer program instructions stored in the read-only memory (ROM) 602 or computer program instructions loaded in the random-access memory (RAM) 603 from a storage unit 608. The RAM 603 can also store all kinds of programs and data required by the operations of the device 600. CPU 601, ROM 602 and RAM 603 are connected to each other via a bus 604. The input/output (I/O) interface 605 is also connected to the bus 604.

A plurality of components in the device 600 is connected to the I/O interface 605, including: an input unit 606, such as keyboard, mouse and the like; an output unit 607, e.g., various kinds of displays and loudspeakers, and the like; a storage unit 608, such as disk and optical disk, and the like; and a communication unit 609, such as network card, modem, wireless transceiver and the like. The communication unit 609 allows the device 600 to exchange information/data with other devices via the computer network, such as Internet, and/or various telecommunication networks.

The above described methods and processes, such as the process 300 and/or process 400, can also be performed by the CPU 601. In some embodiments, the process 300 and/or process 400 can be implemented as a computer software program or a computer program product tangibly included in the machine-readable medium, e.g., storage unit 608. In some embodiments, the computer program can be partially or fully loaded and/or mounted to the device 600 via ROM 602 and/or communication unit 609. When the computer program is loaded to RAM 603 and executed by the CPU 601, one or more actions of the above described process 300 and/or process 400 can be implemented. Alternatively, CPU 601 can be configured via any other suitable manner (e.g., by means of firmware) to execute the process 300 and/or process 400 in other embodiments.

Those skilled in the art would understand that various steps of the method of the disclosure above may be implemented via a general purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It is to be appreciated that although several means or sub-means of the apparatus have been mentioned in detailed description above, such partition is only example but not limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not limiting the present disclosure. For those skilled in the art, the present disclosure may have various alternations and changes. Any modifications, equivalents and improvements made within the spirit and principles of the present disclosure should be included within the scope of the present disclosure.

What is claimed is:

1. A method for load balance, comprising:
   determining, by a network interface card (NIC) of a network node, the NIC comprising a processor that is different from a host processing device of the network node, whether a packet obtained comprises a request to establish an initial network connection for a first device;
   in response to determining that the packet comprises a request to establish the initial network connection, determining whether a load balancing operation associated with the network connection for the packet is to be applied by the processor of the NIC or the host processing device of the network node; and
   in response to determining that the load balancing operation for the packet is to be applied by the processor of the NIC, applying the load balancing operation for the packet among a set of devices using the processor of the NIC, so as to select a second device from the set of devices to establish the network connection with the first device.

2. The method of claim 1, wherein determining whether the load balancing operation is to be applied by the processor of the NIC or the host processing device comprises:
   obtaining at least one of first metadata associated with the network connection and second metadata associated with the NIC;
   determining, based on at least one of the first metadata and the second metadata, a degree of confidence for applying the load balancing operation for the packet by the processor of the NIC; and
   in response to the determined degree of confidence exceeding a threshold degree of confidence, determining that the load balancing operation for the packet is to be applied by the processor of the NIC.

3. The method of claim 2, wherein the first metadata indicates at least one of the following:
   a port that receives the packet,
   a network address corresponding to the packet,
   an active duration of the network connection,
   the number of application requests of the network connection,
   a size of data to be transferred over the network connection, and
   an encryption requirement on data to be transferred over the network connection.

4. The method of claim 2, wherein the second metadata indicates at least one of the following:
   the number of network connections on which load balancing operations are to be applied by the processor of the NIC, and
   resource usage of the processor of the NIC.

5. The method of claim 2, wherein the first metadata indicates a port that receives the packet and wherein determining the degree of confidence comprises:
   determining the degree of confidence by determining whether the port that receives the packet is a listening port configured for the NIC.

6. The method of claim 1, further comprising:
   creating a flow table entry corresponding to the network connection in a flow table, the flow table entry comprising at least a source port of the network connection, a source network address of the network connection, a destination port of the network connection and a destination device that will apply the associated load balance operations of the network connection, the destination device being directed to the processor of the NIC or the host processing device based on a determination of the applying of the load balancing operations.

7. The method of claim 1, further comprising:
   determining whether the packet comprises a request to close an established network connection; and
   in response to determining that the packet comprises a request to close an established network connection, deleting a flow table entry corresponding to the established network connection from a flow table.

8. The method of claim 1, further comprising:
   determining whether the packet comprises data transferred over an established network connection;
   in response to determining that the packet comprises the data transferred over the established network connection, determining a destination device that will apply the load balancing operation for the packet associated with the established network connection; and
   providing the packet to the destination.

9. The method of claim 1, further comprising:
   in response to determining that the load balancing operation for the packet is to be applied by the host processing device, providing the packet to the host processing device for processing.

10. The method of claim 1, wherein the processor of the NIC comprises at least one of a multi-core processor and a dedicated processor.

11. A network interface card (NIC), comprising:
    a processor; and
    a memory coupled to the processor, the memory having instructions stored therein which, when executed by the processor, cause the processor of the NIC to perform acts comprising:
       determining whether a packet obtained comprises a request to establish an initial network connection for a first device;
       in response to determining that the packet comprises a request to establish the initial network connection, determining whether a load balancing operation associated with the network connection for the packet is to be applied by the processor of the NIC or a host processing device on a network node that includes the NIC, the processor of the NIC being different than the host processing device; and in response to determining that the load balancing operation for the packet is to be applied by the processor of the NIC, applying the load balancing operation for the packet among a set of devices using the processor of the NIC, so as to select a second device from the set of devices to establish the network connection with the first device.

12. The NIC of claim 11, wherein determining whether the load balancing operation is to be applied by the processor of the NIC or the host processing device comprises:
obtaining at least one of first metadata associated with the network connection and second metadata associated with the NIC;
determining, based on at least one of the first metadata and the second metadata, a degree of confidence for applying the load balancing operation for the packet by the processor of the NIC; and
in response to the determined degree of confidence exceeding a threshold degree of confidence, determining that the load balancing operation for the packet is to be applied by the processor of the NIC.

13. The NIC of claim 12, wherein the first metadata indicates at least one of the following:
a port that receives the packet,
a network address corresponding to the packet,
an active duration of the network connection,
the number of application requests of the network connection,
a size of data to be transferred over the network connection, and
an encryption requirement on data to be transferred over the network connection.

14. The NIC of claim 12, wherein the second metadata indicates at least one of the following:
the number of network connections on which load balancing operations are to be applied by the processor of the NIC, and
resource usage of the processor of the NIC.

15. The NIC of claim 12, wherein the first metadata indicates a port that receives the packet and wherein determining the degree of confidence comprises:
determining the degree of confidence by determining whether the port that receives the packet is a listening port configured for the NIC.

16. The NIC of claim 11, wherein the acts further comprise:
creating a flow table entry corresponding to the network connection in a flow table, the flow table entry comprising at least a source port of the network connection, a source network address of the network connection, a destination port of the network connection and a destination device that will apply the associated load balancing operations of the network connection, the destination device being directed to the processor of the NIC or the host processing device based on a determination of the applying of the load balancing operations.

17. The NIC of claim 11, wherein the acts further comprise:
determining whether the packet comprises a request to close an established network connection; and
in response to determining that the packet comprises a request to close an established network connection, deleting a flow table entry corresponding to the established network connection from a flow table.

18. The NIC of claim 11, wherein the acts further comprise:
determining whether the packet comprises data transferred over an established network connection;
in response to determining that the packet comprises the data transferred over the established network connection, determining a destination device that will apply the load balancing operation for the packet associated with the established network connection; and
providing the packet to the destination.

19. The NIC of claim 11, wherein the acts further comprise:
in response to determining that the load balancing operation for the packet is to be applied by the host processing device, providing the packet to the host processing device for processing.

20. A computer program product being tangibly stored on a computer-readable medium and comprising computer-executable instructions, the computer-executable instructions, when executed, causing a device to perform a method, the method comprising:
determining, by a network interface card (NIC) of a network node, the NIC comprising a processor that is different from a host processing device of the network node, whether a packet obtained comprises a request to establish an initial network connection for a first device;
in response to determining that the packet comprises a request to establish the initial network connection, determining whether a load balancing operation associated with the network connection for the packet is to be applied by the processor of the NIC or the host processing device of the network node; and
in response to determining that the load balancing operation for the packet is to be applied by the processor of the NIC, applying the load balancing operation for the packet among a set of devices using the processor of the NIC, so as to select a second device from the set of devices to establish the network connection with the first device.

* * * * *